United States Patent [19]

Ballantyne et al.

[11] Patent Number: 4,819,555

[45] Date of Patent: Apr. 11, 1989

[54] PRESS WITH ADJUSTABLE PLATEN SPACING

[75] Inventors: Ronald Ballantyne, Burlington; Leon Malashenko, Toronto, both of Canada

[73] Assignee: John T. Hepburn, Limited, Mississauga, Canada

[21] Appl. No.: 71,143

[22] Filed: Jul. 8, 1987

[30] Foreign Application Priority Data

Jul. 23, 1986 [CA] Canada .................................. 514483

[51] Int. Cl.$^4$ .......................... B30B 7/02; B30B 1/32; B30B 15/04
[52] U.S. Cl. .................................... 100/257; 100/214; 403/337; 72/446; 425/406
[58] Field of Search ................. 72/455, 456, 446, 450; 100/257, 214; 83/859, 529, 525; 403/337, 335, 300, 306; 425/406

[56] References Cited

U.S. PATENT DOCUMENTS

| 1,280,296 | 1/1918 | Pruyn | 100/257 X |
| 4,502,379 | 3/1985 | Sato | 100/257 X |
| 4,694,744 | 9/1987 | Hepburn et al. | 100/214 |
| 4,726,754 | 2/1988 | Breuker et al. | 100/257 X |

FOREIGN PATENT DOCUMENTS 870365  5/1971  Canada .................................. 72/456

Primary Examiner—Andrew M. Falik
Attorney, Agent, or Firm—Sim & McBurney

[57] ABSTRACT

A hydraulic press is adapted to permit adjustment of the clearance between upper and lower platens and to permit the press to be divided into distinct upper and lower sections for purposes of transport. The press has four vertical posts which extend upwardly from the lower platen. Each post has a lower section which slides in the lower platen, an upper section is fitted into and slides relative to the upper platen, and a releasable joining structure which connects the post sections to define a unitary post structure. Light-duty hydraulic cylinders permit gross positioning of the upper platen on the posts. The upper platen is then locked to the upper post sections in a predetermined relative position, and heavy-duty hydraulic cylinders acting on the posts serve to draw the upper platen towards the lower platen to compress a work piece. When platen clearance is to be adjusted, the joining structures are released, hydraulic cylinders formed in the interior of each lower post portion are actuated to raise the associated upper post portions, and the upper platen is supported from the lower platen by mechanical blocks. Mechanical spacers retained by the joining structures are then replaced with spacers of different height thereby adjusting maximum platen clearance. Also, when the joints are released, the press effectively divides into upper and lower sections which can be more conveniently transported.

16 Claims, 6 Drawing Sheets

PRESS WITH ADJUSTABLE PLATEN SPACING

FIELD OF THE INVENTION

The invention relates generally to press construction, and more specifically to presses which permit adjustment of the clearance between press platens and which may be conveniently divided into manageable sections for purposes of transport and subsequent installation at an user's plant.

DESCRIPTION OF THE PRIOR ART

The invention will be described below in the context of a hydraulic press intended primarily for compression molding, but it should be understood that the invention is not limited to such presses.

Compression molding presses commonly have upper and lower platens between which a work piece may be compressed. A very common arrangement involves a movable upper platen guided on side slabs and suspended from a central ram which serves to advance the movable upper platen towards a lower stationary platen. In such presses, the maximum clearance between platens is essentially fixed by the geometry of the press.

The work piece for such a press might typically be a mold constructed in halves, one half normally being bolted to a bolster plate associated with the upper platen, the other half being bolted to a bolster plate associated with the lower platen. The height of the mold which can be accommodated by the press is of course limited by maximum platen clearance. Mold height is not entirely determinative of the maximum separation required. To the extent that one mold half extends into the other to shape a product, additional separation of the platens is required to remove a molded product. The overall height of the press is normally large so that molds of various sizes can be accommodated. Accordingly, such presses tend to be large and heavy.

Presses have been designed which permit continuous variation of platen clearance. In such presses, one platen is mounted on and guided by vertical posts. Light-duty hydraulic cylinders may be used for gross positioning of the post-mounted platen, and latching mechanisms may be actuated to fix the platen to the posts when appropriately positioned. Platen clearance is thus set. Heavy-duty compression phase cylinders can then be actuated to drive the other platen towards the post-mounted platen or to move the posts (slideably mounted to stationary press structure) thereby indirectly drawing the post-mounted platen towards the other platen. Although such presses permit continuous variation of maximum platen clearance, the locking mechanism required to permit variable positioning of the post-mounted platen make such presses prohibitively expenses in many applications.

Another problem associated with large hydraulic presses is that they are difficult to transport and install. For example, a conventional 2000 ton hydraulic press may be greater than 30 feet in total height and may weigh in excess of 150 tons. Such a press must normally be extensively disassembled prior to shipping to permit access to a customer's plant. Reassembly in the customer's plant is time consuming.

In this disclosure, there is described a press which is adapted comparatively inexpensively to permit variation of platen clearance including maximum clearance, minimum clearance and clearance at well-defined intermediate positions and also to permit division of the press into distinct upper and lower sections that can be more conveniently shipped and assembled at an end-user's plant.

BRIEF SUMMARY OF THE INVENTION

In one aspect, the invention provides a press having a base structure which includes a lower platen. The press has a multiplicity of vertical posts, each post having a lower portion mounted to the base structure, an upper portion, and releasable joining means which connect the upper and lower post portions to define a substantially unitary post structure. An upper platen is mounted on the upper post portions above the lower platen, and means are provided for displacing the upper and lower platens relative to one another for purposes of compressing a work piece, removing finished products or the like.

Each of the posts is preferably formed with means for separating the upper and lower post portions when the joining means are released. These separating means are preferably in the form of hydraulic cylinder means mounted at least in part in the interior of each lower post portion. The hydraulic cylinder means may be provided by machining a vertical passage in the lower post portion, mounting a rod in the interior of the passage, providing a sealing means which form a close compartment about the rod, and providing inlet means communicating with the close compartment so that hydraulic fluid under pressure may be applied to the compartment to displace the rod vertically against the upper post portion.

To permit adjustment of platen clearance, mechanical spacing means may be provided, and the joining means at each post, adapted to retain the spacing means. To accommodate the hydraulic cylinder means formed in each post, the spacing means may be annular, or more generally, may be formed with a passage to permit movement of the hydraulic cylinder means against the upper post portions. By providing mechanical spacing means of different size, it is possible to adjust platen separation to accommodate, for example, molds or dies of different heights or ones requiring different amounts of platen separation to permit withdrawal of finished products.

Other inventive aspects and advantages will be described in greater detail with reference to a preferred embodiment and more specifically defined in the claims accompanying this specification.

BRIEF DESCRIPTION OF THE DRAWINGS

The invention will be better understood with reference to drawings in which.

DESCRIPTION OF PREFERRED EMBODIMENT

Figure 1:
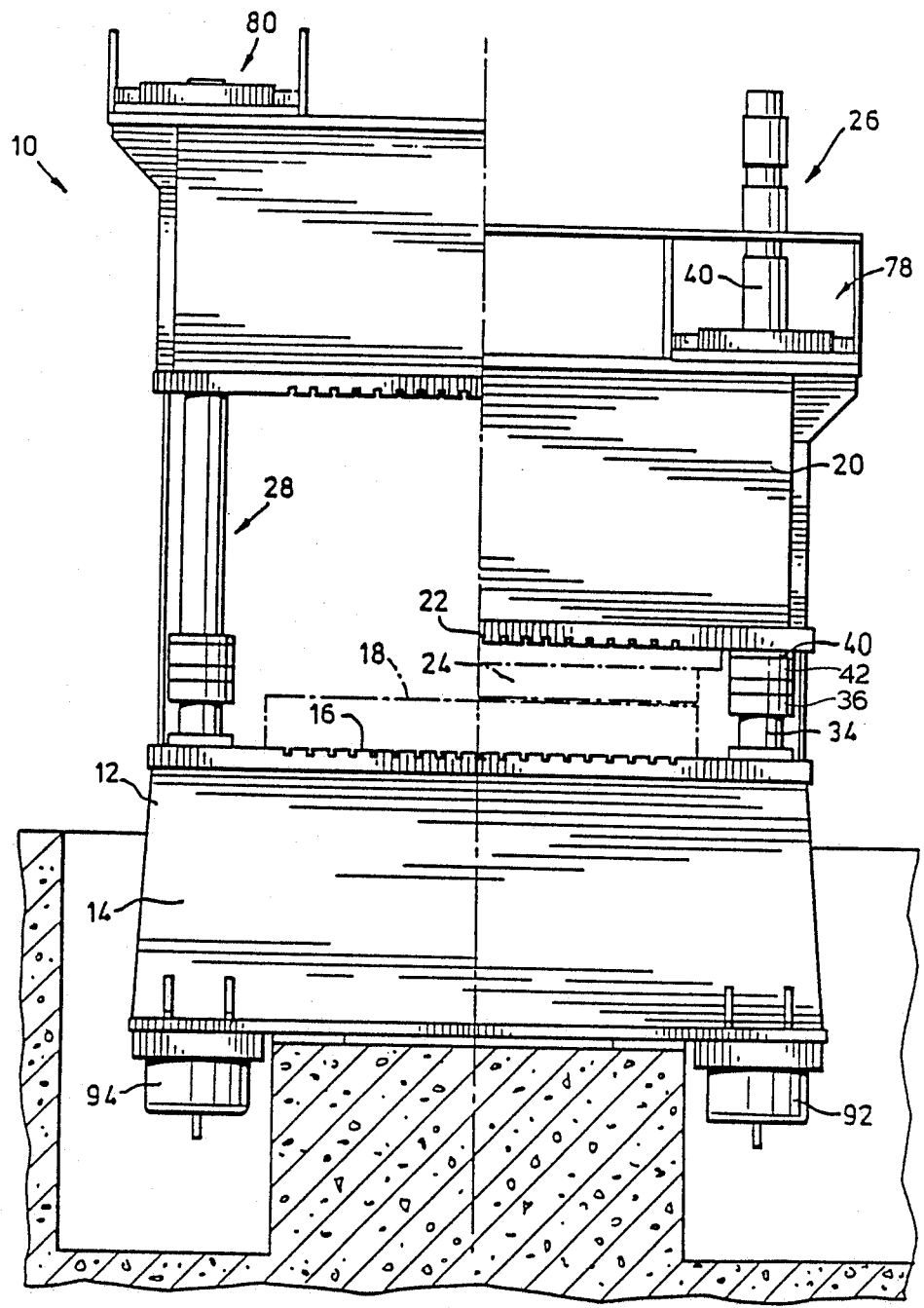
FIG. 1 is a elevational view of a press from the front, the press being divided along a central vertical plane so that the left side of the press shows upper and lower platens maximally separated and the right side of the press shows the platens compressing upper and lower mold halves.

Reference is made to FIG. 1 which illustrates a preferred embodiment of the invention, a hydraulic press 10 having a 2000 ton capacity. The hydraulic pumps and motors required for operation of the press 10 have not been illustrated but in this press design would be mounted entirely at ground level. The hydraulic fluid lines associated with the press have been omitted, as these would tend to obscure the drawings. The appropriate installation of such lines will be readily apparent to those familiar with press design and the operation of hydraulic cylinders, as will other general aspects of the construction of such a press. The press 10 will be described with reference to a compression molding process involving a two-piece mold intended to receive a molding charge and to be compressed to produced a finished product. However, it should be noted that the invention is not limited to such presses or processes.

The press 10 has a base structure 12 of a steel plate construction. The base structure 12 includes fixed lower platen 14, the upper surface of which is defined by a conventional T-slotted steel bolster plate 16 to which a lower mold half 18 has been bolted. The press 10 has a movable upper platen 20 which includes a conventional T-slotted bolster plate 22 to which an upper mold half 24 has been bolted, directly above the lower mold half 18.

Figure 2:
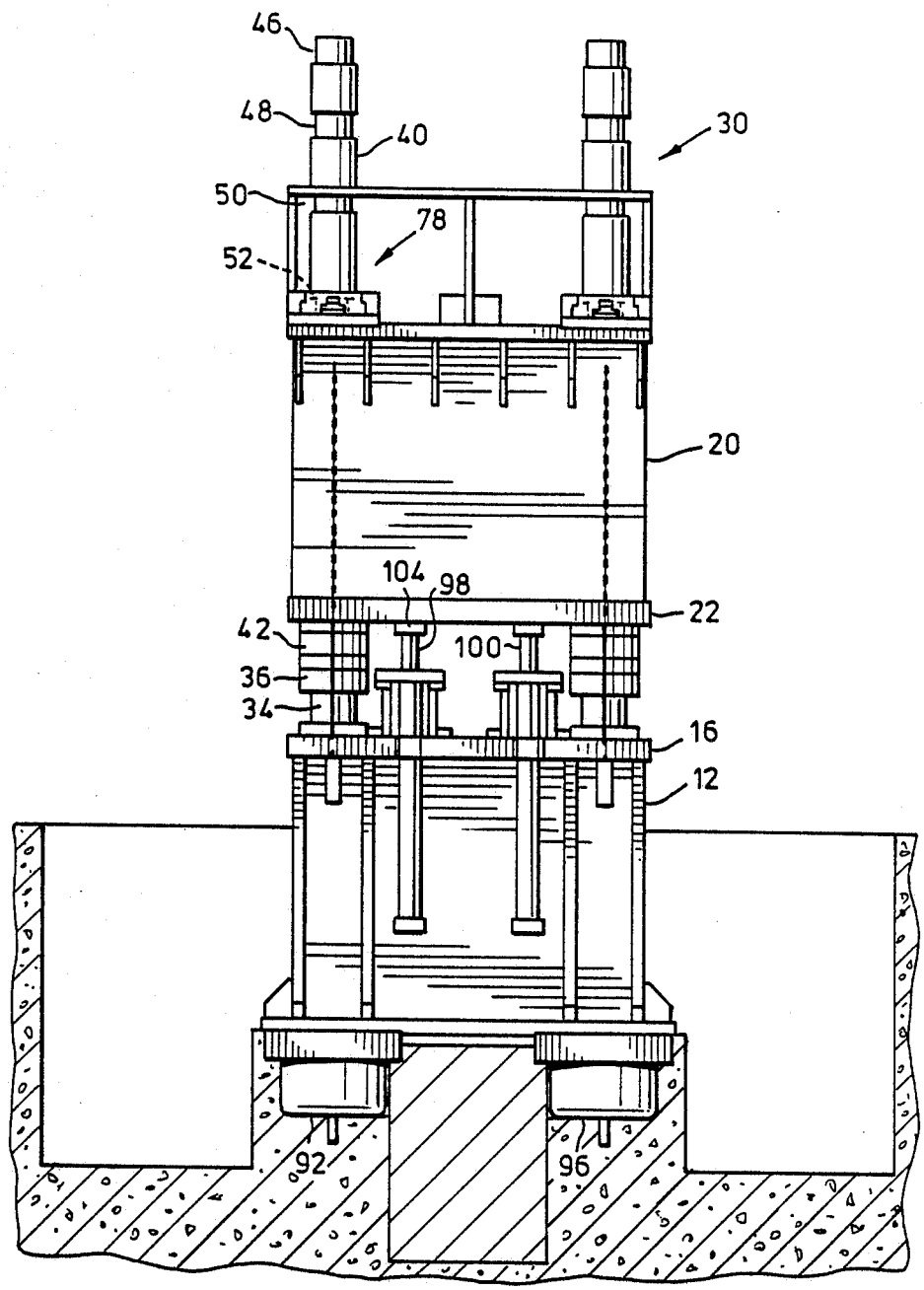
FIG. 2 is a side elevation of the press.

The press 10 has four vertical posts (only three such posts 26, 28, 30 apparent in the drawings) which extend upwardly from the base structure 12 in a generally rectangular arrangement. The post 26 which is typical will be discussed with reference to FIGS. 1, 2 and 3.

The post 26 has a lower section which extends through an opening provided in the bolster plate of the lower platen 14. The lower post section 34 is guided for vertical movement relative to the base structure 12 by upper and lower bushings (not illustrated) mounted in the interior of the lower platen 14. Since in this press design the upper platen 20 is entirely supported by the four posts, it is important that the bushings be robust and spaced to accommodate any transverse forces which might be applied to the posts, particularly during compression phases of operation. The upper end of the lower post portion 34 is terminated with a circumferential connection flange 36 having a recessed annular seating surface 38, which constitutes a part of certain post joining means described more fully below.

The post 26 has an upper section 40 which extends through a vertical passage formed in the upper platen 20. The upper and lower ends of the passage are defined by a pair of bushings (not illustrated), one seated in the upper surface of the platen, the other seated in the lower surface, both being dimensioned to closely receive the post for sliding vertical movement. A lower end of the upper post portion 40 is terminated with a circumferential connection flange 42 which co-operates with the flange 36 formed on the lower post section 34 for purposes of defining a unitary post structure. An upper portion of the flange 42 constitutes an annular abutment shoulder 44 which serves to properly position the upper platen 20 for compression phases of operation. Four vertically-spaced annular recesses 46, 48, 50, 52 are formed in the upper post section 40, and serve as locking structures for receipt of complementary locking elements mounted on the upper platen 20, thereby permitting the upper platen 20 to be locked at preselected positions to the post 26.

Figure 3:
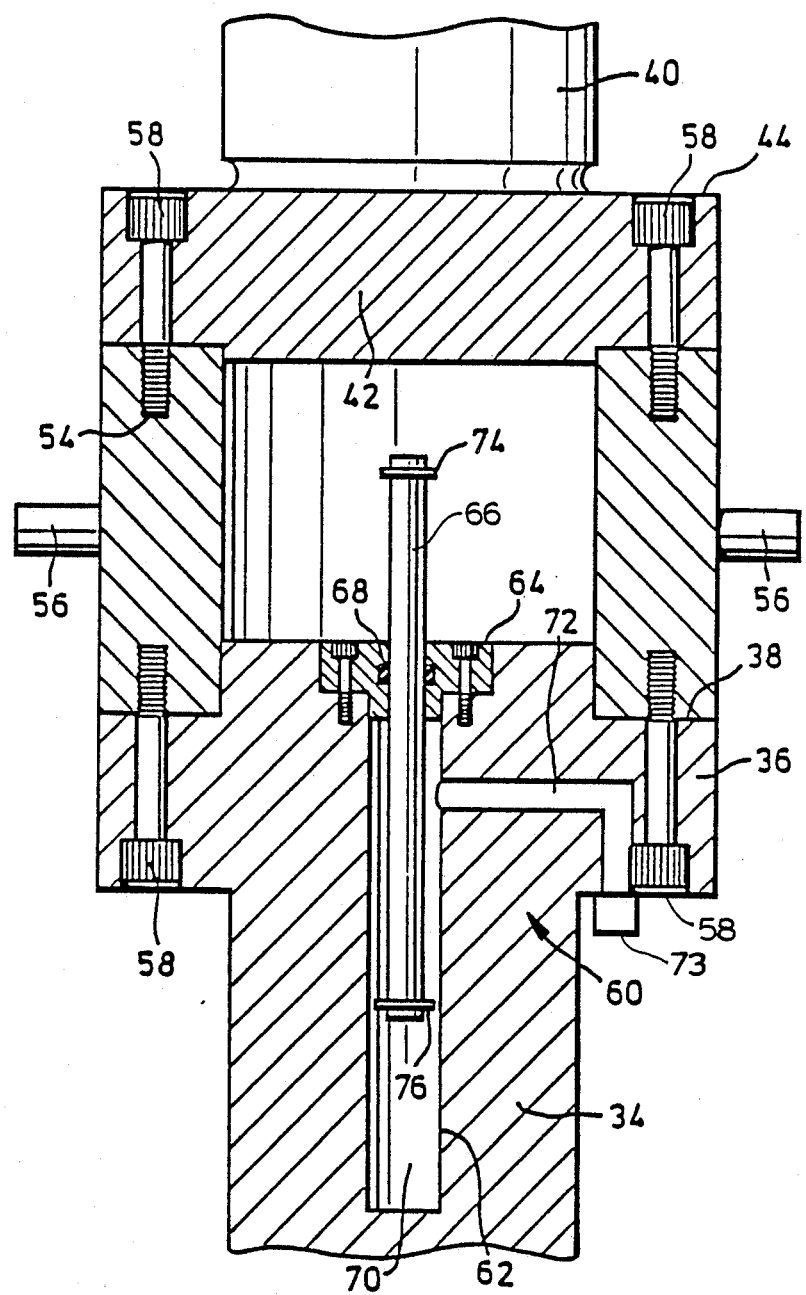
FIG. 3 is a cross-sectional view in a vertical plane of post joining means illustrated in the circled area designated with the reference numeral 3 in FIG. 1.

The joint between the upper and lower post sections is best illustrated in the enlarged cross-sectional view of FIG. 3. A bronze spacer 54 of cylindrical shape is dimensioned to seat in the recessed annular surface 38 formed in the flange 36 associated with the lower post section 34. The spacer 54 has a number of projections 56 by means of which the spacer 54 may be lifted, as with a fork lift. Socket head cap screws (such as the screws 58) extend through clearance holes formed in the connection flanges and are threaded into the spacer 54 which is then securely retained between the connection flanges. Such a joining arrangement is particularly advantageous, as the spacer 54 can be very conveniently replaced with a spacer of different height by simply releasing the cap screws and without replacing any other components of the joint. In particular, new cap screws of a different length are not required. The advantage of this arrangement will be better appreciated by comparison with an alternative joining arrangement described below.

The lower post section 34 has a largely internal hydraulic cylinder 60 which can raise and lower the upper post section 40 when the joint between them is released. The hydraulic cylinder 60 is defined in part by a vertical passage 62 machined in the interior of the lower post section 34. The passage 62 has an open end at the connection flange 36, and a blind end in the interior of the post section. A bronze bushing 64 is seated in the open end of the passage 62, and dimensioned to guide a vertical cylindrical rod 66 for sliding movement relative to the passage 62. A cup seal 68 is provided in the interior of the bushing that engages the rod 66 and defines a closed compartment 70 about the rod 66 within the interior of the passage 62. Another passage 72 is formed in the interior of the lower post section 34, which serves as an inlet for receipt of hydraulic fluid under pressure, and a connector 73 is adapted to permit quick connection of a hydraulic fluid line for such purposes. When the compartment 70 is pressurized, the rod 66 is urged upwardly against the upper post section 40. The upper post section 40 can be lowered relative to the lower post section 34 under gravity by simply discharging hydraulic fluid from the compartment 70 under the control of a needle valve or any other appropriate flow regulating valve. Upper and lower retaining rings 74, 76 are mounted on the rod 66 adjacent its ends to ensure that the rod 66 cannot be ejected from the passage 62 and cannot descend entirely into the interior of the passage 62.

It will be appreciated that the passage 62, rod 66, bushing and seal constitute a single-acting hydraulic cylinder. A piston could be provided on the rod 66 and fitted to the interior walls defining the vertical passage 62; this would permit the hydraulic cylinder to be actively contracted under hydraulic pressure to cause the upper post section 40 to descend. The arrangement illustrated is preferred for simplicity and reduced cost. Regardless whether the hydraulic cylinder is single-or double-acting, this design provides comparatively inexpensive and unobtrusive hydraulic cylinder means for separating the upper and lower post sections.

Figure 5:
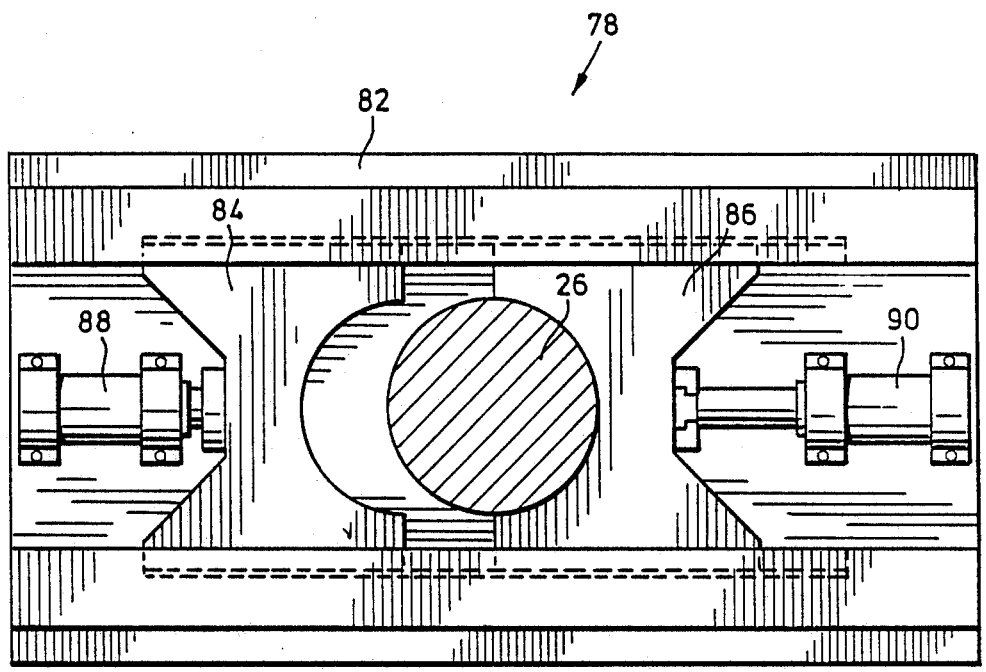
FIG. 5 is a view along the lines 5—5 of FIG. 1 illustrating a mechanism for locking the upper platen to a post comprised by the press; and, FIG. 6 illustrates an alternative post joining structure.

The upper platen 20 can be locked to the upper post sections by means of four identical hydraulically-actuated locking mechanisms (only two such mechanisms 78, 80 specifically indicated in the drawings) which are fixed to the top of the upper platen 20. One locking mechanism is associated with each of the vertical posts, and the construction of the locking mechanism 78 associated with the post 26 is apparent in FIG. 5. The lock mechanism 78 has a rectangular base plate 82 which is apertured to permit passage of the post 26 and in which is formed a longitudinal channel (not specifically indicated) which intersects the axis of the post 26. A pair of steel locking members 84, 86 are mounted for horizontal sliding movement in the channel, one to either side of the post 26. A pair of hydraulic cylinders 88, 90 mounted on the base plate 82 can be actuated simultaneously to advance the lock members 84, 86 towards or away from the post 26. The leading edge of each locking member 84, 86 has a semi-circular shape complementary to that of the post recesses. It should be noted that all four locking mechanisms are operated simultaneously to lock or disengage the upper platen 20 relative to the four upper post sections.

The relationship between the abutment shoulders and the lowermost recesses formed in the posts should be noted. The shoulder 44 which is typical is positioned a preselected distance below the lowermost recess 52. The distance is so selected that when the upper platen 20 is abutted against the shoulder 44, the locking members 84, 86 of the locking mechanism 78 are properly positioned to engage the lowermost recess 52 in the upper post section 40. When so locked to the four posts, the upper platen 20 is oriented for compression phases of operation, and the four posts can then be hydraulically lowered to compress a work piece between the upper and lower platens.

The upper platen locking arrangement represents a very simple and inexpensive mechanism for proper positioning of the upper platen 20 on the posts. The locking arrangement is not, however, a distinct aspect of the present invention, and no claim to any such invention is made in this specification except to the extent that the principles of platen clearance adjustment taught by this disclosure are singularly advantageous in the context of such presses. In that regard it should be noted that in such a press the upper platen has a unique position on the upper post sections for compression phases of operation and three other distinct positions (corresponding to latching of the upper platen to the three upper sets of recesses formed on the upper post sections). The capacity to replace the spacers at each post joint with others of different height allows for adjustment of the platen spacing which will be present at the start of the compression phase of operation. This is important because the compression-phase cylinders are large-bore and consequently slow-acting cylinders whose required travel should be kept comparatively small so as not to impair press cycle time. The stroke of these cylinders and consequently the distance through which they can move the upper platen may typically be less than 6 inches (the compression phase of operation being limited in practice to about 1 inch of travel), and they cannot accommodate major changes in mold height. The arrangement permits not only adjustment of the platen clearance present at the start of the compression phase of operation, but also simultaneous adjustment by equal amounts of the three other positions the upper platen can take on the posts.

Four heavy-duty compression-phase hydraulic cylinders (only three such cylinders 92, 94, 96 apparent in the drawings) and four light-duty rapid advance cylinders (only three such cylinders 98, 100, 102 apparent in the drawings) of the double-acting type are provided to raise and lower the upper platen 20. All of these cylinders are attached to and supported by the lower platen 14. The compression-phase cylinders act between the upper and lower platens through the vertical posts. Each of the compression-phase cylinders supports one of the four posts, the piston rod of each cylinder being threaded into a threaded opening formed in the bottom of the associated lower post section. These cylinders are used primarily to compress a molding charge located between the upper and lower mold halves and for initial separation of the mold halves following processing of the charge, during which phases of operation the upper platen 20 is fixed to the posts by the locking mechanisms.

The rapid advance cylinders are used for gross positioning of the upper platen 20 relative to the lower platen 14 either prior to compression phases or subsequent to mold separation. They permit quick separation of the platens for interchangement of mold parts or introduction of a molding charge. Unlike the compression phase cylinders, the rapid advance cylinders act directly between the upper and lower platens. These cylinder may also be conveniently disconnected from the upper platen 20 for disassembly of the press. For example, the rapid advance cylinder 98 has a connection flange 104 formed at the upper end of its piston rod, which is secured to the bottom of the upper platen 20 by means of cap screws. These can be conveniently unscrewed to release the cylinder 98 from the upper platen 20.

Since the invention is concerned primarily with platen clearance adjustment and with press transport and installation, the general operation of the press 10 will only be briefly described. The upper platen 20 may initially be locked to the uppermost recesses of the four posts. The upper and lower mold halves are bolted to the platens, and a molding charge placed in the interior of the lower mold half. The compression-phase hydraulic cylinders may then be fully extended so that the shoulders associated with the vertical posts are horizontally aligned to define a stop for the upper platen 20. The rapid advance cylinders can then be actuated to take up the load of the upper platen 20, and the locking mechanisms associated with the upper platen 20 released from the uppermost post recesses. The rapid advance cylinders can then be used to lower the upper platen 20 onto the stop defined by the shoulders. With the upper platen 20 now resting on the post shoulders a predetermined distance above and substantially parallel to the lower platen 14, the four locking mechanisms can be actuated to lock the upper platen 20 to the four posts. The compression-phase hydraulic cylinders can then be actuated to draw the four posts downwardly towards the base structure 12, thereby advancing the upper platen 20 towards the lower platen 14 to compress the mold halves and the charge. Following completion of the compression phase, the compression-phase cylinders are extended, thereby separating the mold halves, preferrably until the compression-phase cylinders are once again fully extended. The locking mechanisms can then be released to disengage the upper platen 20 from the four post, the load of the upper platen being taken up by the rapid advance cylinders. The upper platen 20 can then be quickly raised by the rapid advance cylinders relative to the four posts to permit removal of the molded product and re-start of the molding cycle. Once operation is discontinued, the rapid advance cylinders can be used to raise the upper platen 20 to a position where the locking mechanisms can latch the upper platen 20 to the one of the three uppermost sets of post recesses.

Figure 4C:
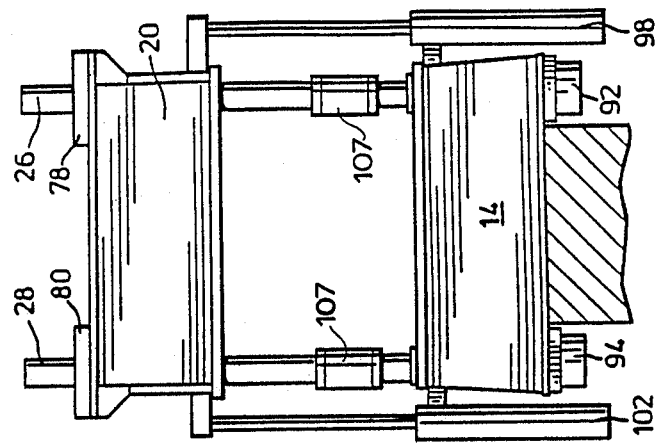
FIGS. 4a–4c diagrammatically illustrate the press in various stages during the process of adjusting clearance between upper and lower press platens.
Figure 4B:
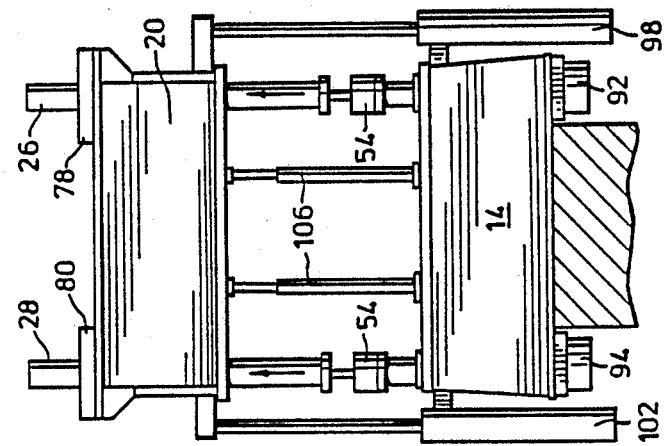
Figure 4A:
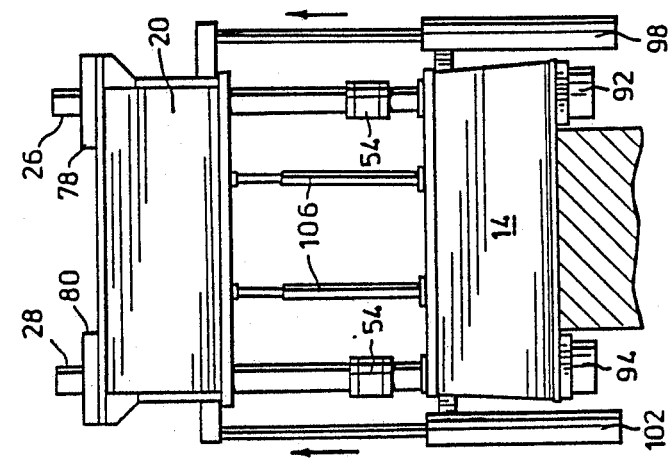

The manner in which platen clearance is varied will be described with reference to FIGS. 4a–4c. In this instance, it will be assumed that platen clearance is to be increased. It should be noted that FIGS. 4a–4c are diagrammatic representations of the press 10, and that the rapid advance cylinders 98, 102 have been shown positioned to either side of the lower platen 14 for the purpose of better illustrating their operation and that they are not in fact positioned in this manner. The actual construction of the press 10 should be understood with reference to the other drawings.

Initial stages of platen clearance adjustment are illustrated in FIG. 4a. The locking mechanisms associated with the upper platen 20 are released, and the upper platen 20 is raised on the rapid advance cylinders to permit access to the four post joints and to allow for an effective increase in the height of the joints. Hydraulic jacks 106 are then positioned on the lower platen 14 and extended to engage and maintain the upper platen 20 in the elevated position. The joints between the upper and lower post sections are then released by unscrewing the associated cap screws.

In FIG. 4b, the hydraulic cylinders formed in the lower post sections have been actuated to separate the upper and lower post sections. The upper post sections are raised until the shoulders associated with the post sections seat against the bottom of the platen at which time the locking mechanisms associated with the upper platen 20 are positioned to engage the lowermost recesses formed in the upper post sections. The locking mechanisms are actuated to lock the upper post sections to the upper platen 20 where they are conveniently retained. The rods associated with the internal hydraulic cylinders of the lower post sections are then permitted to retract under gravity so that the mechanical spacers at the four joints may be engaged with a forklift for removal. These are then replaced with spacers (such as the pair of spacers 107 shown in FIG. 4c) of a greater height.

The internal hydraulic cylinders associated with the posts are then actuated once again to take up the weight of the upper post sections. Once these hydraulic cylinders are engaged with the upper post sections, the locking mechanisms associated with the upper platen 20 are released, and the hydraulic cylinders allowed to contract under the weight of the post sections until the upper post sections engage the new spacers. The various joints between the upper and lower post sections can then be locked once again, to define unitary post structures as in FIG. 4c. The weight of the upper platen 20 may then be taken up by the rapid advance cylinders, and the platen 20 raised and locked to the upper recesses in the posts. The hydraulic jacks 106 can then be removed and the press 10 operated according to normal procedures.

Although the clearance adjusting mechanisms inherent in the press 10 are not as conveniently operated as more complicated mechanisms permitting a press platen to be locked at continuously varying positions on guide posts, it will be apparent to those skilled in the art that the clearance adjusting mechanisms of the press 10 are comparatively inexpensive. In typical molding processes, where mold changes do not occur frequently, the press 10 represents an acceptable and cost-justified alternative to other more complicated press designs.

It should also be noted that the press 10 can be conveniently divided into upper and lower halves for purposes of transport. If fully assembled and tested prior to delivery to an end user, the procedure described above in connection with platen clearance adjustment can be followed until the four post joints have been released, the upper post sections locked to the upper platen, and the associated spacers removed. The connection flanges joining the rapid advance cylinders to the bottom of the upper platen 20 can be released, thereby entirely disconnecting the upper platen 20 together with the upper post sections from the base structure 12. The upper press section can then be moved with appropriate lifting equipment and shipped distinct from the lower press section. The base structure 12 in which all rapid advance and compression phase cylinders are mounted may also be transported as a convenient unit. Subsequent installation of the press at an end user's plant is simply the reverse of this process. An upper horizontal plate may be provided, joining the upper ends of the four post sections, to ensure retention of the post sections with the upper platen, but provision of such a plate would necessitate simultaneous raising and lower of the upper post section at all phases of operation.

Figure 6:
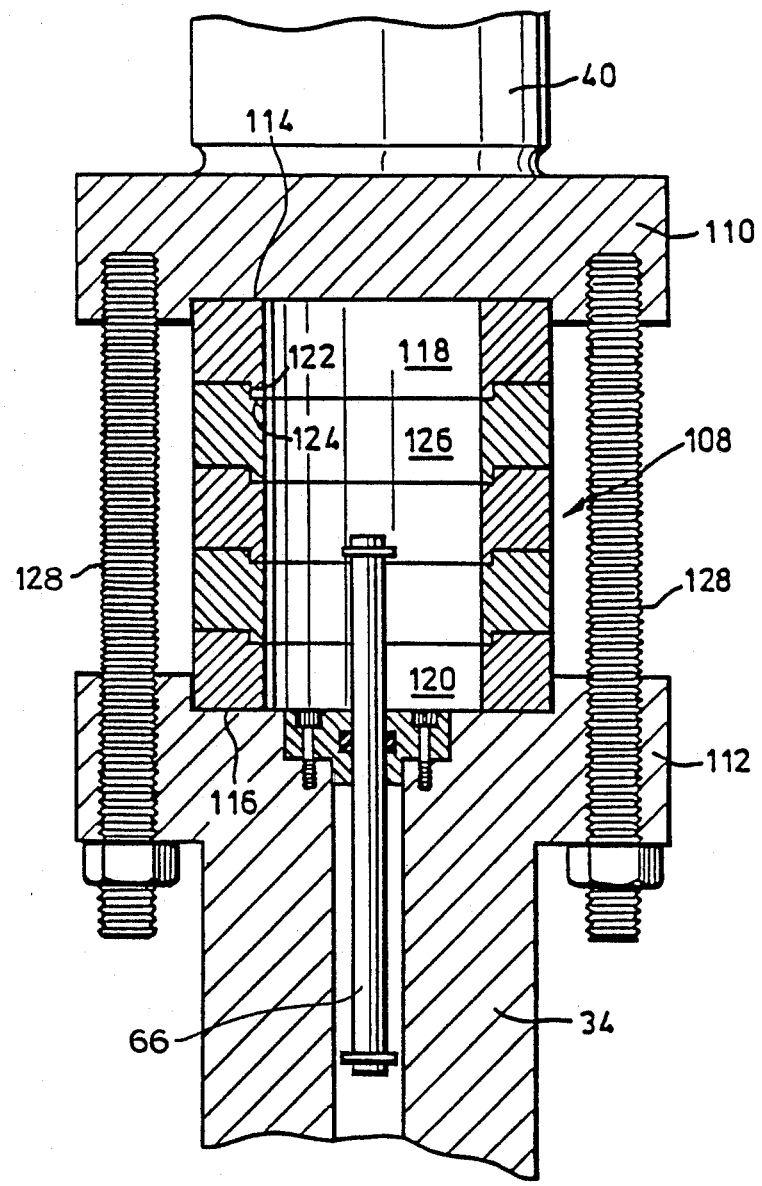

FIG. 6 illustrates an alternative joint for releasably securing upper and lower post sections. The mechanical spacing means 108 in this instance are constituted by a number of annular spacing elements spigotted so that they can be conveniently stacked to define a cylindrical structure. Upper and lower post connection flanges 110, 112 are provided which are formed with circular recesses 114, 116 that properly locate and seat the upper and lower spacer units 118, 120. One adjacent pair of spacing elements 118, 126 may be seen to comprise complimentary aligning structure for vertically aligning the pair of elements. This aligning structure comprises an annular shoulder 122 formed on the spacer 118 and a complimentary annular recess 124 associated with the spacing element 126. Similar complimentary aligning structure will be observed between each adjacent pair of spacer elements. Bolts such as the bolts 128 are used to join the upper and lower connection flanges 110, 112, and the joint is secured in this instance by nuts threaded onto the bolts. The maximum spacer height which can be accommodated is limited by the length of the bolts, and care must be taken to ensure that the bolts are not replaced with excessively long bolts that might accidentally engage the upper and lower platens during press operation. The advantage of this arrangement is that the spacing between the upper and lower platens may be adjusted on an incremental basis.

It will be appreciated that a preferred embodiment of the invention has been described and that this particular press design should not be construed as limiting the principles of operation inherent in the invention or the scope of the appended claims.

We claim:
1. A press, comprising:
   a base structure including a lower platen;
   a multiplicity of vertical posts, each of the posts having
   (a) a lower post portion mounted to the base structure,
   (b) an upper post portion, and
   (c) joining means for releasably joining the upper and lower post portions to define a substantially unitary post structure, the joining means including mechanical spacing means for spacing the upper and lower post portions, an upper flange formed at the bottom of the upper post portion, a lower flange formed at the top of the lower post portion, the upper and lower flanges being adapted to retain the spacing means between the flanges, and threaded fastener means for releasably connecting the upper and lower flanges;

an upper platen mounted on the upper post portions above the lower platen; and, means for displacing the upper and lower platen relative to one another.

2. A press as claimed in claim 1 in which for each of the joining means the threaded fastener means comprise a first plurality of threaded fasteners extending through the upper flange and threaded into the spacing means and a second plurality of threaded fasteners extending through the lower flange and threaded into the spacing means.

3. A press as claimed in claim 1 in which the spacing means comprise a plurality of spacing elements stacked one atop another, each adjacent pair of the stacked spacing elements comprising complementary aligning structure for vertically aligning the adjacent pair.

4. A press as claimed in claim 1 in which:

each of the posts includes hydraulic cylinder means mounted in the lower post portion and separate from the upper post portion for raising and lowering the upper post portion relative to the lower post portion when the joining means are released;

the mechanical spacing means associated with each post are formed with a vertical passage aligned with the direction of action of the hydraulic cylinder means permitting the hydraulic cylinder means to extend vertically to engage the upper post portion.

5. A press comprising:

a base structure including a lower platen;

a multiplicity of vertical posts, each of the posts having (a) a lower post portion mounted to the base structure, (b) an upper post portion, (c) joining means for releasably joining the upper and lower post portions to define a substantially unitary post structure, (d) an upper platen mounted on the upper post portions above the lower platen; and, means for displacing the upper and lower platen relative to one another, each post comprises hydraulic separating means attached to the post for raising and lowering the upper post portion relative to the lower post portion when the joining means are released.

6. A press as claimed in claim 5 in which the separating means of each of the posts include hydraulic cylinder means, the hydraulic cylinder means associated with each post comprising:

a generally vertical passage formed in the lower post portion, the passage having an open upper end and a blind lower end;

a rod;

means mounting the rod to the lower post portion at least in part in the interior of the passage for vertical movement relative to the lower post portion;

sealing means for forming a closed compartment about the rod in the interior of the lower post portion; and, inlet means communicating with the closed compartment for permitting hydraulic fluid under pressure to be applied to the closed compartment to displace the rod vertically.

7. A hydraulic press, comprising:

a base structure including a lower platen;

a multiplicity of vertical posts, each of the posts having (a) a lower post portion mounted for vertical movement within the base structure, (b) an upper post portion, and (c) joining means for releasably joining the upper and lower post portions to define a substantially unitary post structure; and, an upper platen interfitted with the upper post portions and guided by the posts for movement to and from the lower platen;

controllable locking means mounted on the upper platen for releasably locking the upper platen to the multiplicity of posts;

first hydraulic cylinder means acting between the base structure and the lower post portions for raising and lowering the multiplicity of posts; and, second hydraulic cylinder means acting between the base structure and the upper platen for raising and lowering the upper platen relative to the posts when the locking means are released.

8. A press as claimed in claim 7 in which the locking means comprise a multiplicity of locking mechanisms, one of the locking mechanisms being associated with each of the upper post portions, and in which each of the upper post portions comprises:

means defining a mechanical stop positioned below the upper platen;

a locking structure adapted to be engaged by the associated locking mechanism, the locking structure being positioned a predetermined distance above the mechanical stop, the predetermined distance being such that the associated locking mechanism is positioned to engage the locking structure when the upper platen engages the mechanical stop.

9. A press as claimed in claim 8 in which the joining means associated with each post comprise mechanical spacing means for spacing the upper and lower post portions, the joining means being adapted to releasably retain the spacing means.

10. A press as claimed in claim 9 in which the joining means associated with each post comprise:

an upper flange formed at the bottom of the upper post portion;

a lower flange formed at the top of the lower post portion;

the upper and lower flanges being adapted to retain the spacing means between the flanges;

threaded fastener means for releasably connecting the upper and lower flanges.

11. A press as claimed in claim 10 in which the spacing means comprise a plurality of spacing elements stacked one atop another, each adjacent pair of the stacked spacing elements comprising complementary aligning structure for vertically aligning the adjacent pair.

12. A press as claimed in claim 10 in which in each of the joining means the threaded fastener means comprises a first plurality of threaded fasteners extending through the upper flange and threaded into the spacing means and a second plurality of threaded fasteners extending through the lower flange and threaded into the spacing means.

13. A press as claimed in claim 9 in which:
each of the posts includes hydraulic cylinder means mounted in the lower post portion and separate from the upper post section for raising and lowering the upper post portion relative to the lower post portion when the joining means are released;
the mechanical spacing means associated with each post are formed with a vertical passage aligned with the direction of action of the hydraulic cylinder means mounted in the lower post portion permitting the hydraulic cylinder means to extend vertically to engage the upper post portion.

14. A press as claimed in claim 7 in which each of the posts comprises means for raising and lowering the upper post portion relative to the lower post portion when the joining means associated with the post are released.

15. A press as claimed in claim 7 in which each of the posts includes hydraulic cylinder means for raising and lowering the upper post portion relative to the lower post portion when the joining means are released, the hydraulic cylinder means comprising:
a generally vertical passage formed in the lower post portion, the passage having an open upper end and a blind lower end;
a rod;
means mounting the rod to the lower post section at least in part in the interior of the passage for vertical movement relative to the lower post section;
sealing means for forming a closed compartment about the rod in the interior of the lower post portion; and,
inlet means communicating with the closed compartment for permitting hydraulic fluid under pressure to be applied to the closed compartment to displace the rod vertically.

16. A hydraulic press divisible into upper and lower press sections for transport, comprising:
a base structure including a lower platen;
a multiplicity of vertical posts, each of the posts having
(a) a lower post portion mounted for vertical movement within the base structure,
(b) an upper post portion, and
(c) joining means for releasably joining the upper and lower post portions to define a substantially unitary post structure; and,
an upper platen interfitted with the upper post portions, the upper platen being supported solely by and guided by the upper post portions for movement to and from the lower platen;
controllable locking means mounted on the upper platen for releasably locking the upper platen to the upper post portions of the multiplicity of posts;
first hydraulic cylinder means attached to the base structure and to the lower post sections for raising and lowering the multiplicity of posts;
second hydraulic cylinder means attached to the base structure for raising and lowering the upper platen relative to the posts when the locking means are released; and,
releasable connection means for releasably attaching the first hydraulic cylinder means to the upper platen.

* * * * *